US011668787B2

(12) United States Patent
Shi

(10) Patent No.: US 11,668,787 B2
(45) Date of Patent: Jun. 6, 2023

(54) WAVEGUIDE WITH LOBE SUPPRESSION

(71) Applicant: Aptiv Technologies Limited, St. Michael (BB)

(72) Inventor: Shawn Shi, Thousand Oaks, CA (US)

(73) Assignee: Aptiv Technologies Limited, St. Michael (BB)

( * ) Notice: Subject to any disclaimer, the term of this patent is extended or adjusted under 35 U.S.C. 154(b) by 200 days.

(21) Appl. No.: 17/162,664

(22) Filed: Jan. 29, 2021

(65) Prior Publication Data

US 2022/0244346 A1 Aug. 4, 2022

(51) Int. Cl.
| | |
|---|---|
| *G01S 7/03* | (2006.01) |
| *B60R 16/023* | (2006.01) |
| *G01S 13/931* | (2020.01) |
| *H01P 3/12* | (2006.01) |
| *H01Q 13/10* | (2006.01) |
| *G01S 7/00* | (2006.01) |

(52) U.S. Cl.
CPC .............. *G01S 7/03* (2013.01); *B60R 16/023* (2013.01); *G01S 13/931* (2013.01); *H01P 3/122* (2013.01); *H01Q 13/10* (2013.01)

(58) Field of Classification Search
None
See application file for complete search history.

(56) References Cited

U.S. PATENT DOCUMENTS

| 3,032,762 | A | * | 5/1962 | Johnl | ............... | H01Q 21/20 |
| | | | | | | 343/771 |
| 3,328,800 | A | | 6/1967 | Algeo | | |
| 3,462,713 | A | | 8/1969 | Knerr | | |
| 3,579,149 | A | | 5/1971 | Ramsey | | |
| 3,594,806 | A | | 7/1971 | Black et al. | | |
| 4,157,516 | A | | 6/1979 | Van De Grijp | | |
| 4,453,142 | A | | 6/1984 | Murphy | | |

(Continued)

FOREIGN PATENT DOCUMENTS

| CA | 2654470 | 12/2007 |
| CN | 1620738 | 5/2005 |

(Continued)

OTHER PUBLICATIONS

M. Razmhosseini et al; "Parasitic Slot Elements for Bandwidth Enhancement of Slotted Waveguide Antennas"; conference paper from Sep. 2019; posted at Researchgate.net. (Year: 2019).*

(Continued)

*Primary Examiner* — Bernarr E Gregory
(74) *Attorney, Agent, or Firm* — Sawtooth Patent Group PLLC

(57) ABSTRACT

This document describes techniques, apparatuses, and systems for a waveguide with lobe suppression. A waveguide is described that includes a pipe for containing a dielectric, the pipe defining an open end to a longitudinal direction through the pipe. An array of radiating slots is formed through a surface of the pipe and in communication with the dielectric. To suppress grating lobes in an antenna pattern, the waveguide includes at least one parasitic groove that is separate from the pipe and with at least a portion of a length that is parallel to the array of radiating slots. In this way, the waveguide provides an antenna pattern where grating lobes are suppressed or substantially reduced.

20 Claims, 7 Drawing Sheets

(56) References Cited

U.S. PATENT DOCUMENTS

| | | |
|---|---|---|
| 4,562,416 A | 12/1985 | Sedivec |
| 4,590,480 A | 5/1986 | Nikolayuk et al. |
| 5,030,965 A | 7/1991 | Park et al. |
| 5,638,079 A | 6/1997 | Kastner et al. |
| 5,982,256 A | 11/1999 | Uchimura et al. |
| 5,986,527 A | 11/1999 | Ishikawa et al. |
| 6,166,701 A | 12/2000 | Park et al. |
| 6,489,855 B1 | 12/2002 | Kitamori et al. |
| 6,794,950 B2 | 9/2004 | Du Tolt et al. |
| 6,867,660 B2 | 3/2005 | Kitamori et al. |
| 6,958,662 B1 | 10/2005 | Salmela et al. |
| 7,091,919 B2 | 8/2006 | Bannon |
| 7,973,616 B2 | 7/2011 | Shijo et al. |
| 7,994,879 B2 | 8/2011 | Kim et al. |
| 8,013,694 B2 | 9/2011 | Hiramatsu et al. |
| 8,089,327 B2 | 1/2012 | Margomenos et al. |
| 8,159,316 B2 | 4/2012 | Miyazato et al. |
| 8,604,990 B1 | 12/2013 | Chen et al. |
| 8,692,731 B2 | 4/2014 | Lee et al. |
| 9,007,269 B2 | 4/2015 | Lee et al. |
| 9,203,139 B2 * | 12/2015 | Zhu .................. H01Q 1/243 |
| 9,450,281 B2 | 9/2016 | Kim |
| 9,673,532 B2 | 6/2017 | Cheng et al. |
| 9,935,065 B1 | 4/2018 | Baheti et al. |
| 10,283,832 B1 | 5/2019 | Chayat et al. |
| 10,381,741 B2 | 8/2019 | Kirino et al. |
| 10,468,736 B2 | 11/2019 | Mangaiahgari |
| 10,775,573 B1 | 9/2020 | Hsu et al. |
| 10,833,385 B2 | 11/2020 | Mangaiahgari et al. |
| 11,349,220 B2 | 5/2022 | Alexanian et al. |
| 11,444,364 B2 | 9/2022 | Shi |
| 2002/0021197 A1 | 2/2002 | Elco |
| 2003/0052828 A1 * | 3/2003 | Scherzer .................. H01Q 5/42 343/795 |
| 2004/0069984 A1 | 4/2004 | Estes et al. |
| 2004/0090290 A1 * | 5/2004 | Teshirogi ........... H01Q 21/0087 333/237 |
| 2005/0237253 A1 | 10/2005 | Kuo et al. |
| 2006/0113598 A1 | 6/2006 | Chen et al. |
| 2007/0013598 A1 | 1/2007 | Artis et al. |
| 2007/0054064 A1 | 3/2007 | Ohmi et al. |
| 2008/0129409 A1 | 6/2008 | Nagaishi et al. |
| 2008/0150821 A1 | 6/2008 | Koch et al. |
| 2009/0207090 A1 | 8/2009 | Pettus et al. |
| 2009/0243762 A1 | 10/2009 | Chen et al. |
| 2010/0321265 A1 | 12/2010 | Yamaguchi et al. |
| 2012/0013421 A1 | 1/2012 | Hayata |
| 2012/0050125 A1 | 3/2012 | Leiba et al. |
| 2012/0068316 A1 | 3/2012 | Ligander |
| 2012/0163811 A1 | 6/2012 | Doany et al. |
| 2012/0242421 A1 | 9/2012 | Robin et al. |
| 2012/0256796 A1 | 10/2012 | Leiba |
| 2013/0057358 A1 | 3/2013 | Anthony et al. |
| 2014/0015709 A1 | 1/2014 | Shijo et al. |
| 2014/0091884 A1 | 4/2014 | Flatters |
| 2014/0106684 A1 | 4/2014 | Burns et al. |
| 2015/0097633 A1 | 4/2015 | Devries et al. |
| 2015/0229017 A1 | 8/2015 | Suzuki et al. |
| 2015/0357698 A1 | 12/2015 | Kushta |
| 2015/0364804 A1 | 12/2015 | Tong et al. |
| 2015/0364830 A1 | 12/2015 | Tong et al. |
| 2016/0043455 A1 | 2/2016 | Seler et al. |
| 2016/0049714 A1 | 2/2016 | Ligander et al. |
| 2016/0118705 A1 | 4/2016 | Tang et al. |
| 2016/0126637 A1 | 5/2016 | Uemichi |
| 2016/0204495 A1 | 7/2016 | Takeda et al. |
| 2016/0276727 A1 | 9/2016 | Dang et al. |
| 2016/0293557 A1 | 10/2016 | Topak et al. |
| 2016/0301125 A1 | 10/2016 | Kim et al. |
| 2017/0003377 A1 | 1/2017 | Menge |
| 2017/0084554 A1 | 3/2017 | Dogiamis et al. |
| 2017/0324135 A1 | 11/2017 | Blech et al. |
| 2018/0013208 A1 * | 1/2018 | Izadian .............. H01Q 21/0087 |
| 2018/0131084 A1 | 5/2018 | Park et al. |
| 2018/0226709 A1 | 8/2018 | Mangaiahgari |
| 2018/0233465 A1 | 8/2018 | Spella et al. |
| 2018/0284186 A1 | 10/2018 | Chadha et al. |
| 2018/0301819 A1 | 10/2018 | Kirino et al. |
| 2018/0343711 A1 | 11/2018 | Wixforth et al. |
| 2018/0351261 A1 | 12/2018 | Kamo et al. |
| 2019/0006743 A1 | 1/2019 | Kirino et al. |
| 2019/0013563 A1 | 1/2019 | Takeda et al. |
| 2019/0187247 A1 * | 6/2019 | Izadian .................. G01S 13/931 |
| 2019/0245276 A1 | 8/2019 | Li et al. |
| 2019/0252778 A1 | 8/2019 | Duan |
| 2020/0021001 A1 | 1/2020 | Mangaiahgairi |
| 2020/0044360 A1 * | 2/2020 | Kamo ........................ G01S 7/03 |
| 2020/0112077 A1 | 4/2020 | Kamo et al. |
| 2020/0203849 A1 | 6/2020 | Lim et al. |
| 2020/0212594 A1 * | 7/2020 | Kirino ...................... G01S 7/03 |
| 2020/0235453 A1 | 7/2020 | Lang |
| 2020/0287293 A1 | 9/2020 | Shi et al. |
| 2020/0319293 A1 | 10/2020 | Kuriyama et al. |
| 2020/0343612 A1 | 10/2020 | Shi |
| 2021/0028528 A1 * | 1/2021 | Alexanian ............ H01Q 1/3233 |
| 2021/0036393 A1 | 2/2021 | Mangaiahgari |

FOREIGN PATENT DOCUMENTS

| | | |
|---|---|---|
| CN | 2796131 | 7/2006 |
| CN | 201383535 | 1/2010 |
| CN | 102157787 A | 8/2011 |
| CN | 102420352 A | 4/2012 |
| CN | 103515682 | 1/2014 |
| CN | 104900956 | 9/2015 |
| CN | 105609909 | 5/2016 |
| CN | 105680133 | 6/2016 |
| CN | 105958167 | 9/2016 |
| CN | 109980361 A | 7/2019 |
| CN | 209389219 | 9/2019 |
| CN | 110401022 A | 11/2019 |
| DE | 112017006415 | 9/2019 |
| DE | 102019200893 | 7/2020 |
| EP | 2500978 | 9/2012 |
| EP | 2843758 | 3/2015 |
| EP | 3460903 | 3/2019 |
| EP | 4089840 A1 | 11/2022 |
| GB | 2463711 A | 3/2010 |
| GB | 2489950 | 10/2012 |
| JP | 2003289201 | 10/2003 |
| JP | 2013187752 A | 9/2013 |
| KR | 100846872 | 5/2008 |
| KR | 1020080044752 A | 5/2008 |
| WO | 9934477 A1 | 7/1999 |
| WO | 2013189513 | 12/2013 |
| WO | 2018003932 | 1/2018 |

OTHER PUBLICATIONS

"Foreign Office Action", CN Application No. 201810122408.4, dated Oct. 18, 2021, 19 pages.

"Non-Final Office Action", U.S. Appl. No. 16/829,409, dated Oct. 14, 2021, 13 pages.

"Non-Final Office Action", U.S. Appl. No. 17/061,675, dated Dec. 20, 2021, 4 pages.

Wang, et al., "Mechanical and Dielectric Strength of Laminated Epoxy Dielectric Graded Materials", Mar. 2020, 15 pages.

"Extended European Search Report", EP Application No. 18153137.7, dated Jun. 15, 2018, 8 pages.

"Extended European Search Report", EP Application No. 20166797, dated Sep. 16, 2020, 11 pages.

"Non-Final Office Action", U.S. Appl. No. 16/583,867, dated Feb. 18, 2020, 8 pages.

"Non-Final Office Action", U.S. Appl. No. 15/427,769, dated Nov. 13, 2018, 8 pages.

"Notice of Allowance", U.S. Appl. No. 15/427,769, dated Jun. 28, 2019, 9 pages.

"Notice of Allowance", U.S. Appl. No. 16/583,867, dated Jul. 8, 2020, 8 Pages.

Jankovic, et al., "Stepped Bend Substrate Integrated Waveguide to Rectangular Waveguide Transitions", Jun. 2016, 2 pages.

(56) References Cited

OTHER PUBLICATIONS

"Foreign Office Action", CN Application No. 201810122408.4, dated Jun. 2, 2021, 15 pages.
"Extended European Search Report", EP Application No. 21212703.9, dated May 3, 2022, 13 pages.
Huang, et al., "The Rectangular Waveguide Board Wall Slot Array Antenna Integrated with One Dimensional Subwavelength Periodic Corrugated Grooves and Artificially Soft Surface Structure", Dec. 20, 2008, 10 pages.
Ogiwara, et al., "2-D MoM Analysis of the Choke Structure for Isolation Improvement between Two Waveguide Slot Array Antennas", 2007 Asia-Pacific Microwave Conference, 2007, 4 pages.
"Extended European Search Report", EP Application No. 21211165.2, dated May 13, 2022, 12 pages.
"Extended European Search Report", EP Application No. 21211167.8, dated May 19, 2022, 10 pages.
"Extended European Search Report", EP Application No. 21211168.6, dated May 13, 2022, 11 pages.
"Extended European Search Report", EP Application No. 21211452.4, dated May 16, 2022, 10 pages.
"Extended European Search Report", EP Application No. 21211478.9, dated May 19, 2022, 10 pages.
"Extended European Search Report", EP Application No. 22160898.7, dated Aug. 4, 2022, 11 pages.
"WR-90 Waveguides", Pasternack Enterprises, Inc., 2016, Retrieved from https://web.archive.org/web/20160308205114/http://www.pasternack.com:80/wr-90-waveguides-category.aspx, 2 pages.
Alhuwaimel, et al., "Performance Enhancement of a Slotted Waveguide Antenna by Utilizing Parasitic Elements", Sep. 7, 2015, pp. 1303-1306.
Gray, et al., "Carbon Fibre Reinforced Plastic Slotted Waveguide Antenna", Proceedings of Asia-Pacific Microwave Conference 2010, pp. 307-310.
Li, et al., "Millimetre-wave slotted array antenna based on double-layer substrate integrated waveguide", Jun. 1, 2015, pp. 882-888.
Mak, et al., "A Magnetoelectric Dipole Leaky-Wave Antenna for Millimeter-Wave Application", Dec. 12, 2017, pp. 6395-6402.
Mallahzadeh, et al., "A Low Cross-Polarization Slotted Ridged SIW Array Antenna Design With Mutual Coupling Considerations", Jul. 17, 2015, pp. 4324-4333.
Rossello, et al., "Substrate Integrated Waveguide Aperture Coupled Patch Antenna Array for 24 GHz Wireless Backhaul and Radar Applications", Nov. 16, 2014, 2 pages.
Schneider, et al., "A Low-Loss W-Band Frequency-Scanning Antenna for Wideband Multichannel Radar Applications", IEEE Antennas and Wireless Propagation Letters, vol. 18, No. 4, Apr. 2019, pp. 806-810.
Shehab, et al., "Substrate-Integrated-Waveguide Power Dividers", Oct. 15, 2019, pp. 27-38.
Wu, et al., "A Planar W-Band Large-Scale High-Gain Substrate-Integrated Waveguide Slot Array", Feb. 3, 2020, pp. 6429-6434.
Xu, et al., "CPW Center-Fed Single-Layer SIW Slot Antenna Array for Automotive Radars", Jun. 12, 2014, pp. 4528-4536.

\* cited by examiner

WAVEGUIDE WITH LOBE SUPPRESSION

BACKGROUND

Some devices (e.g., radar) use electromagnetic signals to detect and track objects. The electromagnetic signals are transmitted and received using one or more antennas. An antenna may be characterized in terms of gain, beam width, or, more specifically, pattern, which is a measure of the gain as a function of direction. A precisely controlled pattern may improve applications that require electromagnetic signals, and a waveguide may be used to improve such characteristics. The waveguide can include perforations or radiating slots that guide radiation near the antenna. Grating lobes, or secondary main lobes, may arise when the perforation spacing is greater than one-half wavelength of the transceiver signal.

SUMMARY

This document describes techniques, apparatuses, and systems for a waveguide with lobe suppression. In some examples, an apparatus may include a waveguide including a pipe for containing a dielectric, the pipe defining an open end to a longitudinal direction through the pipe, and further including an array of radiating slots through a surface of the pipe and in communication with the dielectric. The waveguide further including at least one parasitic groove separate from the pipe and with at least a portion of a length that is parallel to the array of radiating slots.

In some examples, a system may include a coupler, a transceiver operable upon actuation to interact with electromagnetic waves associated with the coupler, and a waveguide. The waveguide includes a pipe for capturing the electromagnetic waves and containing a dielectric, the pipe defining an open end to a longitudinal direction through the pipe. The waveguide further including an array of radiating slots through a surface of the pipe and in communication with the dielectric, and at least one parasitic groove separate from the pipe and with at least a portion of a length that is parallel to the array of radiating slots.

In this way, the waveguide provides an antenna pattern where grating lobes are suppressed or substantially reduced. This document also describes other configurations and systems for providing lobe suppression.

This Summary introduces simplified concepts related to lobe suppression for waveguides with lobe suppression, which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of waveguides with lobe suppression are described in this document with reference to the following drawings. The same numbers are used throughout the drawings to reference like features and components.

DETAILED DESCRIPTION

Overview

Figure 1:
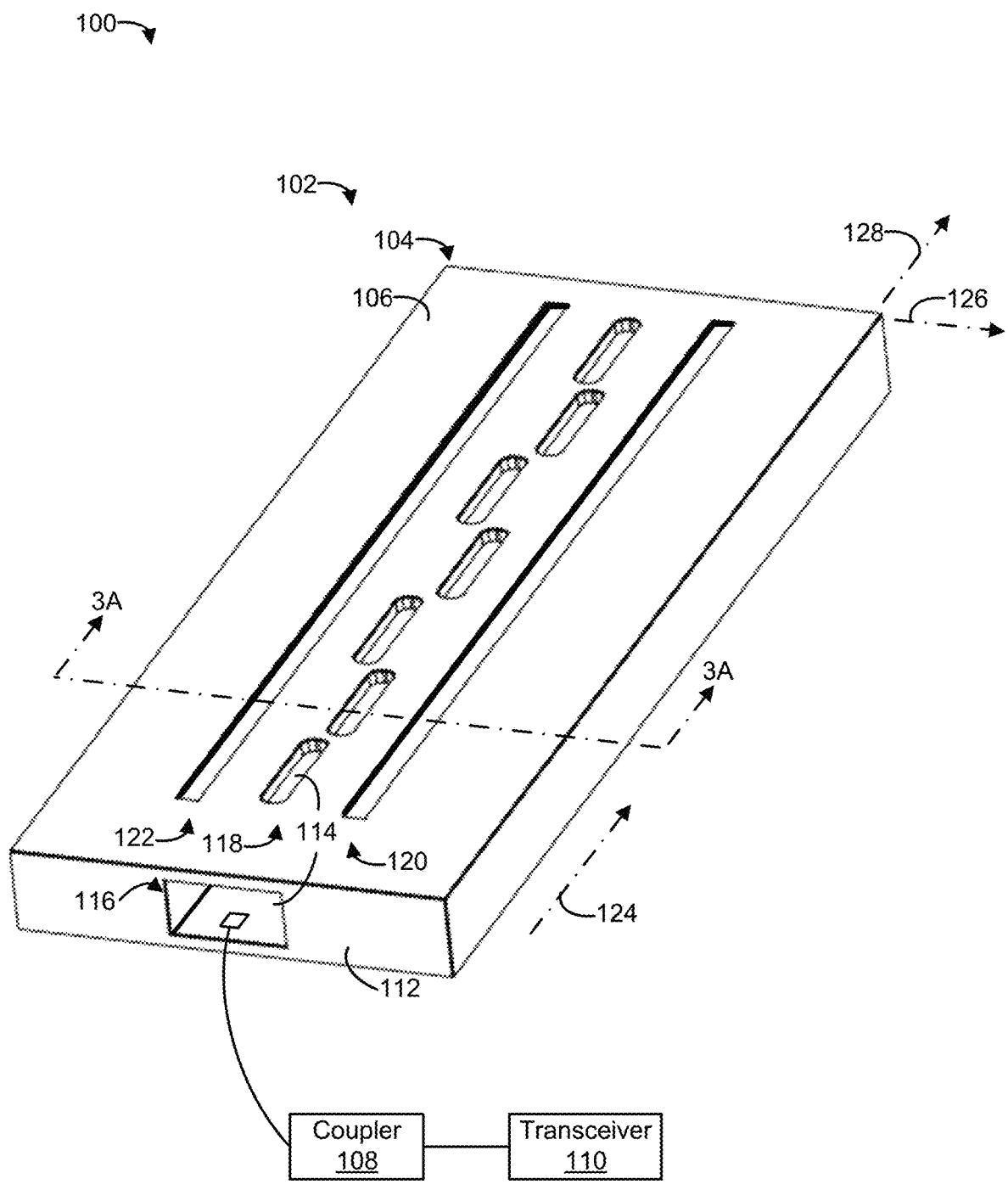
FIG. 1 illustrates an example system with an example waveguide with lobe suppression, in accordance with one or more implementations of the present disclosure.

Radar systems are a sensing technology used in many industries (including the automotive industry) to acquire information about the surrounding environment. An antenna, such as one described herein, may be employed in radar systems to transmit and receive electromagnetic energy or signals. Such a radar system may use multiple antenna-elements in an array to provide increased gain and directivity over what can be achieved using a single antenna-element. As taught herein, signals from the individual elements are combined with appropriate phases and weighted amplitudes to provide the desired antenna-reception pattern during reception. The antenna arrays are also used in transmission, splitting signal power amongst the elements and using appropriate phases and weighted amplitudes to provide the desired antenna transmission pattern.

Consider, for example, a waveguide employed to transfer electromagnetic energy to and from the antenna elements. The waveguide can include an array of radiating slots. The radiating slots represent apertures of the waveguide, which may be arranged to provide desired phasing, combining, or splitting of signals and energy. As an example, the radiating slots, which may also sometimes referred to as apertures, may be equally spaced in a surface of the waveguide, along a propagation direction of the electromagnetic waves. The radiating slots may cause grating lobes to appear in an antenna pattern. The size and shape of the grating lobes are based on the spacing and arrangement of the array of radiating slots. Reduced form factors may cause undesired grating lobe propagation according to ratios between radiating slot lengths, radiating slot spacing, wavelengths of the electromagnetic signal, and other organizational factors associated with the waveguide. The geometry of the waveguide may be adjusted, or the radiating slots may be rearranged in an attempt to reduce grating lobes below design specifications.

In contrast to this and other techniques, a waveguide with lobe suppression is described. To suppress grating lobes in an antenna pattern, the waveguide includes at least one parasitic groove that is separate from the pipe and with at least a portion of a length that is parallel to the array of radiating slots. The at least one parasitic groove has a uniform narrow width and uniform depth and is spaced apart from an array of radiating slots to achieve the desired lobe suppression. The parasitic groove is in a same surface of the waveguide, which defines the array of radiating slots. This parasitic groove may be defined according to various geometric shapes. As one example, the grooves may be linear and arranged in parallel to the radiating slots. In this way, the waveguide provides an antenna pattern where grating lobes are suppressed or substantially reduced.

The example waveguide may be particularly advantageous for use in an automotive context, for example, detecting objects in a roadway. The grating lobes can indicate false detections within an automotive radar field-of-view. Suppressing these grating lobes improves accuracy of the radar as the number of false detections is reduced.

In this way, the present disclosure describes lobe suppression with a waveguide. Indeed, such application of this and other examples provided in this disclosure increased radiation performance of a waveguide. These are but a few examples of how the described techniques and devices may be used to suppress grating lobes for multi-element waveguides. The document now turns to an example operating environment, after which example devices, methods, and systems are described.

Example System

FIG. 1 illustrates an example system 100 that includes a waveguide 102 in accordance with techniques, apparatuses, and systems of this disclosure. The system 100 includes the waveguide 102, a coupler 108, a transceiver 110. The transceiver 110 may be operable upon actuation to interact with electromagnetic waves associated with the coupler 108 and the waveguide 102.

The transceiver 110 may be a variety of components and may be a receiver or transmitter only. The coupler 108 is a link between the transceiver 110 and the waveguide 102 and may be a coaxial cable or another implement that connects through the open end 112 of the waveguide 102, forming an antenna assembly. The open end 112 may be opposite a closed end of the pipe 104. The open end 112 may define an opening such that the open end borders the dielectric 114 and defines an opening to a channel 116 through the pipe 104.

The waveguide 102 includes a pipe 104. The pipe 104 may comprise various materials having various geometric shapes. The pipe 104 may be formed from metal to have a rectangular cross-section. Other non-exhaustive examples include cylindrical or square cross-sections.

The pipe 104 includes an array of radiating slots 118 arranged on a surface 106 of the waveguide 102. The radiating slots 118 may be in communication with the dielectric 114, allowing electromagnetic waves propagated through the dielectric to bidirectionally flow through the radiating slots 118. The dielectric 114 may be any material. As an example, the dielectric 114 may be air from an environment surrounding the waveguide 102. Dielectric contained within the pipe 104 of the waveguide 102 may be reduced or removed to generate a vacuum volume defined by the waveguide 102.

Separate from the pipe 104, the waveguide 102 includes a parasitic groove 120. The parasitic groove 120 may be implemented as various geometric shapes. In one example, the parasitic groove 120 may be linear and defined in parallel to the radiating slots 118. A second parasitic groove 122 of the waveguide 102 may be separate from the pipe 104. The second parasitic groove 122 may be similar to the parasitic groove 120 but on an opposite side of the radiating slots 118. The parasitic grooves 120, 122 may be defined anywhere on the pipe 104 and may be on a same side of the radiating slots 118 to achieve a particular suppression of grating lobes.

The pipe 104 defines a longitudinal direction 128 and a latitudinal direction 126 perpendicular to the longitudinal direction 128. The parasitic grooves 120, 122 may be in parallel to the longitudinal direction 128. A propagation direction defined in the direction of electromagnetic waves traversing the pipe 104 and emanating from the coupler 108 may also be in parallel with the longitudinal direction 128. In this way, the parasitic grooves 120, 122 may be in parallel to the propagation direction of the electromagnetic waves that traverse the pipe 104.

Figure 2A:
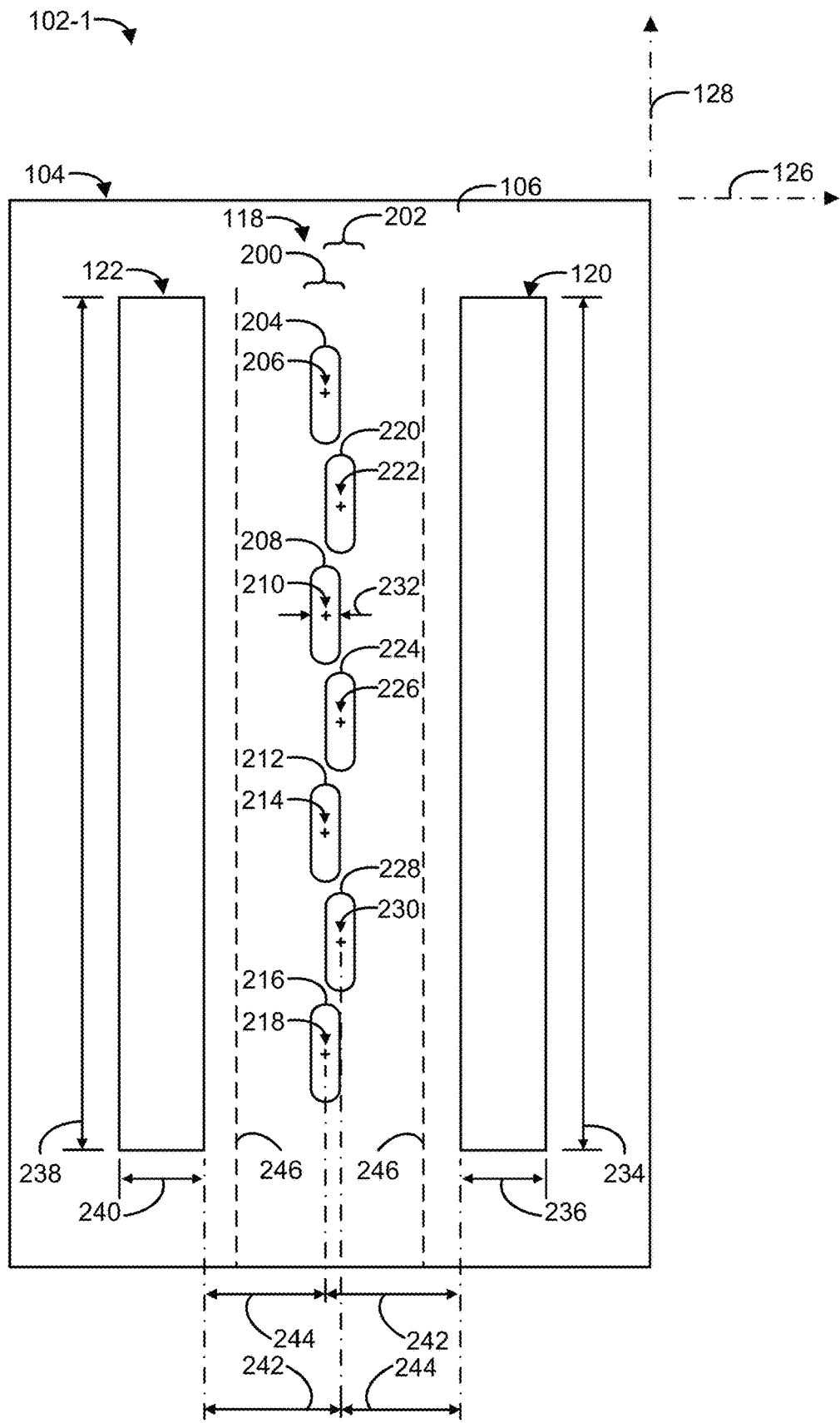
FIG. 2A illustrates a top-down view of an example waveguide with lobe suppression, in accordance with one or more implementations of the present disclosure.

FIG. 2A illustrates a top-down view of an example waveguide 102-1 with lobe suppression, in accordance with one or more implementations of the present disclosure. The waveguide 102-1 shown in FIG. 2A illustrates similar components to those depicted in FIG. 1 and is therefore an example of the waveguide 102-1. The pipe 104 defines a surface 106. Radiating slots 118 may be defined by the pipe 104 through the surface 106. First radiating slots 204, 208, 212, and 216 are arranged in a first row 200, and the first row 200 may be parallel to the longitudinal direction 128. The first radiating slots 204, 208, 212, and 216 may define respective first centroids 206, 210, 214, and 218. In an example, centroids may be defined as a geometric center of the respective shape or radiating slot. Second radiating slots 220, 224, and 228 are arranged in a second row 202, and the second row 202 may be parallel to the longitudinal direction 128. The second radiating slots 220, 224, and 228 may define respective second centroids 222, 226, and 230. The radiating slots 204, 208, 212, 216, 220, 224, and 228 may be slots defined to radiate electromagnetic waves propagated through the pipe 104. The radiating slots 204, 208, 212, 216, 220, 224, and 228 may be various geometric shapes. The radiating slots 204, 208, 212, 216, 220, 224, and 228 may be defined within boundaries of the channel 246 (as shown in FIG. 2A), communicating with the dielectric 114 or empty space defined therein.

The first row 200 may be interleaved with the second row 202. As an example, the first row 200 overlaps with the second row 202 in the longitudinal direction 128. The first radiating slots 204, 208, 212, and 216 alternate with the second radiating slots 220, 224, and 228 in the longitudinal direction 128 forming a row or pseudo row (e.g., radiating slots 204, 220, 208, 224, 212, 228, and 216). The first radiating slots 204, 208, 212, and 216 may be spaced from the second radiating slots 220, 224, and 228 in the latitudinal direction 126 according to the respective centroids 206, 210, 214, 218, 222, 226, and 230. The first centroids 206, 210, 214, and 218 may be aligned in the longitudinal direction 128, and the second centroids 222, 226, and 230 may be aligned in the longitudinal direction 128.

In an example, parasitic groove 120 is defined on the surface 106, and the parasitic groove 120 is defined in parallel with the longitudinal direction 128. As such, the parasitic groove 120 may be in parallel with the first row 200 and the second row 202.

Figure 4:
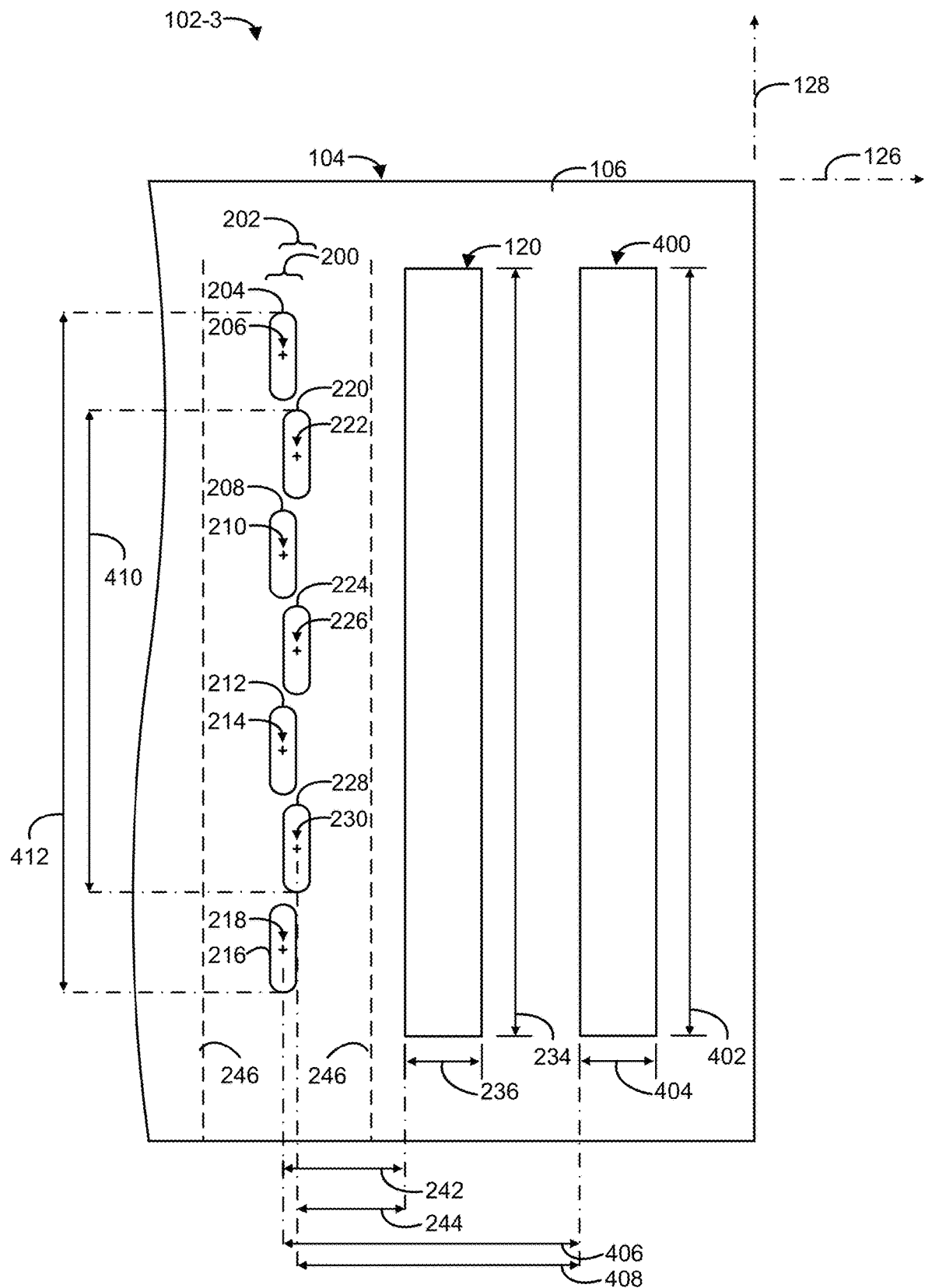
FIG. 4 illustrates a top-down view of an example waveguide with lobe suppression, in accordance with one or more implementations of the present disclosure.

The parasitic groove 120 may be spaced a first distance 242 from the first centroids 206, 210, 214, and 218 and spaced a second distance 244 from the second centroids 222, 226, and 230. The parasitic groove 120 may be spaced from the first centroids 206, 210, 214, and 218 and the second centroids 222, 226, and 230 in the latitudinal direction. In an example, the parasitic groove 120 defines a length 234. The length 234 may be defined as the longest measure between edges of the parasitic groove 120 and may be uniform or non-uniform across the groove 120. In the example, the length 234 is greater than a first-row length 410 (as shown in FIG. 4). The first-row length 410 may be a collective length of all of the radiating slots 204, 220, 208, 224, 212, 228, and 216. In another example, the collective length may be the first-row length 410 added to the second-row length 412. The length 234 may also be greater than a second-row length 412 (also shown in FIG. 4).

In the example, the parasitic groove 120 defines a width 236. The width 236 is defined in the latitudinal direction 126 and may be less than a radiating slot width 232. The radiating slot width 232 may be uniform or non-uniform for all of the radiating slots 204, 208, 212, 216, 220, 224, and 228 or across all of the radiating slots 204, 208, 212, 216, 220, 224, and 228. In the example, the width 236 is related to a width of the radiating slots 204, 208, 212, 216, 220, 224, and 228, and the width 236 may be uniform or non-uniform across the parasitic groove 120.

A second parasitic groove 122 may be defined on the surface 106. The second parasitic groove 122 and the parasitic groove 120 may bound one or more of the radiating slots 204, 208, 212, 216, 220, 224, and 228 in one or more directions. The parasitic groove 120 and the second parasitic groove 122 may bound the radiating slots 204, 208, 212, 216, 220, 224, and 228 in the longitudinal direction 128 (as shown). In an example, the second parasitic groove 122 defines a length 238 and a width 240. The length 238 and the width 240 may be uniform or non-uniform across respective portions of the second parasitic groove 122. The length 238 may be equal to the length 234, and the width 240 may be equal to the width 236. As such, the second parasitic groove 122 may be in parallel with the first row 200 and the second row 202. The second parasitic groove 122 may be spaced the first distance 242 from the second centroids 222, 226, and 230 and spaced the second distance 244 from first centroids 206, 210, 214, and 218. The parasitic groove 120 may be spaced from the first centroids 206, 210, 214, and 218 and the second centroids 222, 226, and 230 in the latitudinal direction.

Figure 2B:
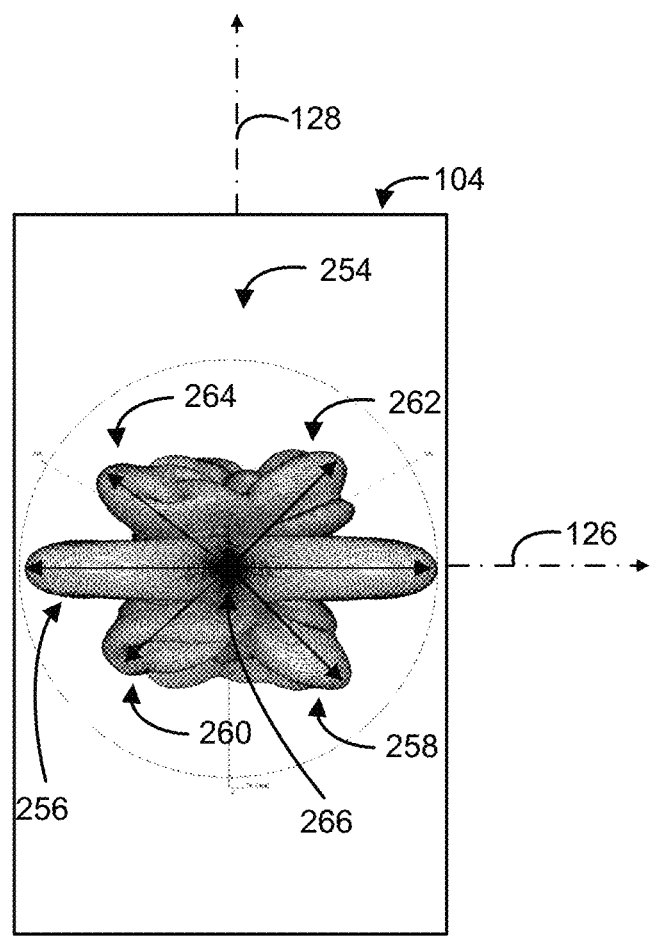
FIG. 2B illustrates a plan view and radiating pattern of the example waveguide shown in 2A.

FIG. 2B illustrates a plan view and radiating pattern 254 of the example waveguide shown in 2A. When propagating, the pipe 104 radiates electromagnetic waves similar to radiation pattern 254 with respect to the defined longitudinal direction 128 and latitudinal direction 126.

The radiation pattern 254 includes a main lobe 256 and associated grating lobes 258, 260, 262, 264, and 266. The grooves 120 and 122 depicted in FIG. 2A may be defined to reduce the grating lobes 258, 260, 262, 264, and 266. The effect of the parasitic grooves 120 and 122 may be to suppress the grating lobes 258, 260, 262, 264, and 266 below negative twenty decibels for use in various applications, which reduces noise and interference with the associated signal.

Figures 3A, 3B:
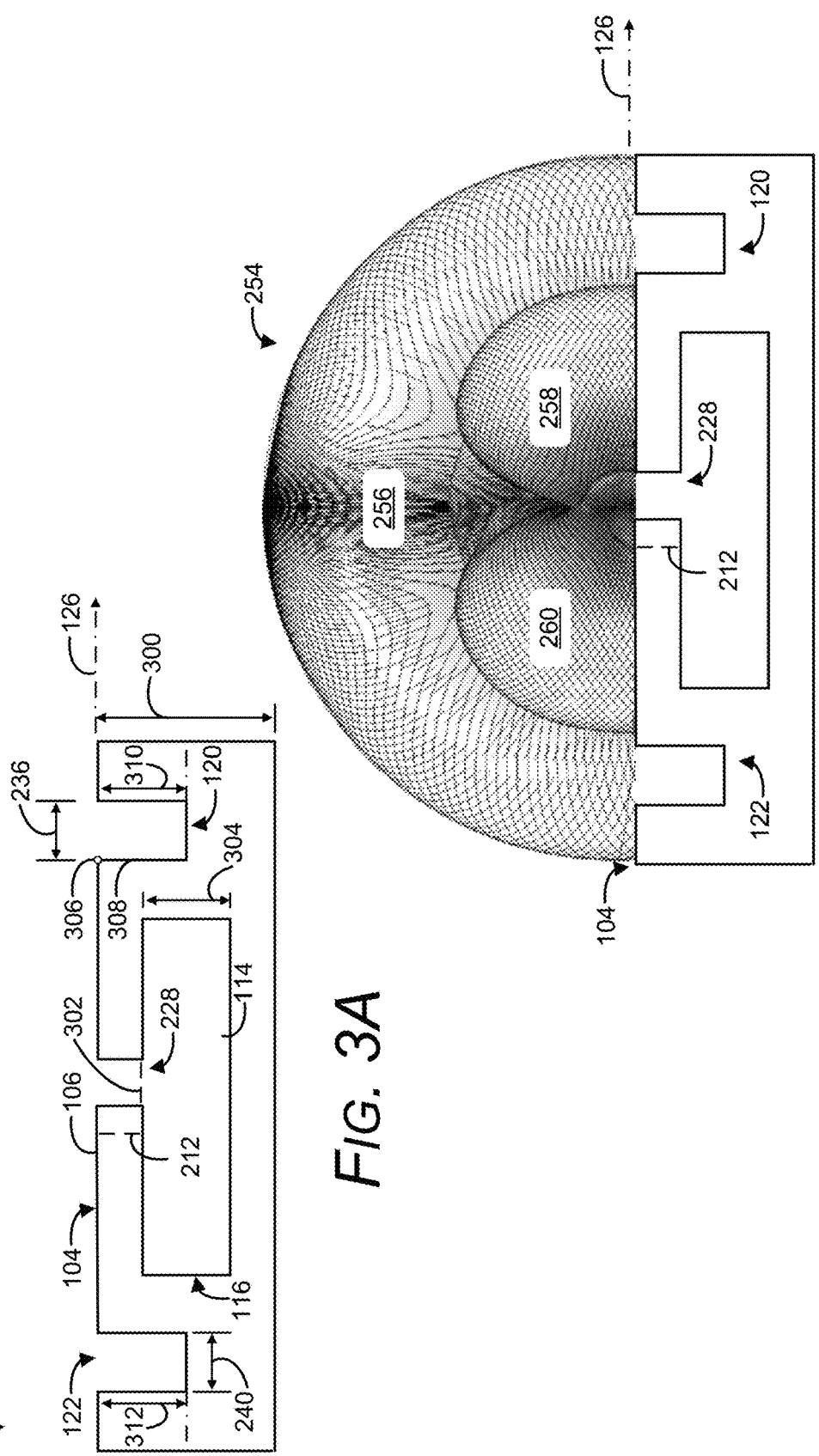
FIG. 3A illustrates a cross-sectional side view of an example waveguide with lobe suppression, in accordance with one or more implementations of the present disclosure.
FIG. 3B illustrates a side view of radiated grating lobes, in accordance with one or more implementations of the present disclosure.

FIG. 3A illustrates a cross-sectional side view of an example waveguide 102-2 with lobe suppression, in accordance with one or more implementations of the present disclosure. The waveguide 102-2 is an example of the waveguide 102 and 102-1.

A cross-section of the pipe 104 is shown perpendicular to the longitudinal direction 128 and the latitudinal direction 126. The pipe 104 includes a surface 106 defining the parasitic groove 120 and the second parasitic groove 122, along with radiating slots 212 and 228. The pipe 104 may define an outer diameter 300 and an inner diameter 304. The dielectric 114 may fill the inner diameter 304. The inner diameter 304 may be defined by the channel 116.

The parasitic groove 120 defines a depth 310. The depth 310 may be uniform or non-uniform across the entire parasitic groove 120. The depth 310 may include a portion that is less than the outer diameter 300. In another example, the depth 310 includes a portion that is less than the inner diameter 304. The parasitic groove 120 may be defined by a wall or walls 308 perpendicular to the surface at a vertex 306 of the walls 308 and the surface 106.

The second parasitic groove 122 defines a depth 312. The depth 312 may be uniform or non-uniform across the entire second parasitic groove 122. The depth 312 may include a portion that is less than the outer diameter 300. In another example, the depth 312 includes a portion that is less than the inner diameter 304.

FIG. 3B illustrates a side view of radiated grating lobes, in accordance with one or more implementations of the present disclosure. The pipe 104 defines the radiation pattern 254 according to the parasitic grooves 120 and 122 and the radiating slots 204, 208, 212, 216, 220, 224, and 228. As shown in this view, the radiation pattern 254 includes the main lobe 256 and the grating lobes 258 and 260. The radiation energy of grating lobes 258 and 260 may be reduced by the parasitic grooves 120 and 122.

FIG. 4 illustrates a top-down view of an example waveguide 102-3 with lobe suppression, in accordance with one or more implementations of the present disclosure. The waveguide 102-3 is an example of the waveguides 102, 102-1, and 102-2.

In the waveguide 102-3, the first radiating slots 204, 208, 212, and 216 are arranged in a first row 200, and the first row 200 may be parallel to the longitudinal direction 128. The first radiating slots 204, 208, 212, and 216 may define respective first centroids 206, 210, 214, and 218. In an example, centroids may be defined as a geometric center of the respective shape or radiating slot. Second radiating slots 220, 224, and 228 are arranged in a second row 202, and the second row 202 may be parallel to the longitudinal direction 128. The second radiating slots 220, 224, and 228 may define respective second centroids 222, 226, and 230. The radiating slots 204, 208, 212, 216, 220, 224, and 228 may be slots defined to radiate electromagnetic waves propagated through the pipe 104. The radiating slots 204, 208, 212, 216, 220, 224, and 228 may be various geometric shapes. The radiating slots 204, 208, 212, 216, 220, 224, and 228 may be defined within boundaries of the channel 246, communicating with the dielectric 114 or empty space defined therein. The first row 200 may be interleaved with the second row 202. The parasitic groove 120 may be defined on the surface 106.

In an example, the parasitic groove 120 is defined in parallel with the longitudinal direction 128. As such, the parasitic groove 120 may be in parallel with the first row 200 and the second row 202 of radiating slots. The parasitic groove 120 may be spaced a first distance 242 from the first centroids 206, 210, 214, and 218 and spaced a second distance 244 from the second centroids 222, 226, and 230. The parasitic groove 120 may be spaced from the first centroids 206, 210, 214, and 218 and the second centroids 222, 226, and 230 in the latitudinal direction. In an example, the parasitic groove 120 defines a length 234. The length 234 may be defined as the longest measure between edges of the parasitic groove 120 and may be uniform or non-uniform across the parasitic groove 120. In the example, the length 234 is greater than a first-row length 410 (as shown in FIG. 4). The length 234 may also be greater than a second-row length 412 (also shown in FIG. 4). In the example, the parasitic groove 120 defines a width 236. The width 236 is defined in the latitudinal direction 126. In the example, the width 236 is related to a width of the radiating slots 204, 208, 212, 216, 220, 224, and 228, and the width 236 may be uniform or non-uniform across the parasitic groove 120.

The pipe 104 of the waveguide 102-3 defines another parasitic groove 400. The other parasitic groove 400 may be similarly situated with regard to the parasitic groove 120, in parallel with the first row 200 and the second row 202. another width 404 similar to the width 236, and another length 402 similar to the length 234, may be defined by the other parasitic groove 400. The length 402 and other width 404 may be uniform or non-uniform across the other parasitic groove 400. The first centroids 206, 210, 214, and 218 may be spaced from the other parasitic groove 400 by a third distance 406, and the other parasitic groove 400 may be spaced a fourth distance 408 from the second centroids 222, 226, and 230. The other parasitic groove 400 can be spaced from the first centroids 206, 210, 214, and 218 and the second centroids 222, 226, and 230 in the latitudinal direction. The first distance 242 may be less than the third distance 406, and the second distance 244 may be less than the fourth distance 408.

Figure 5:
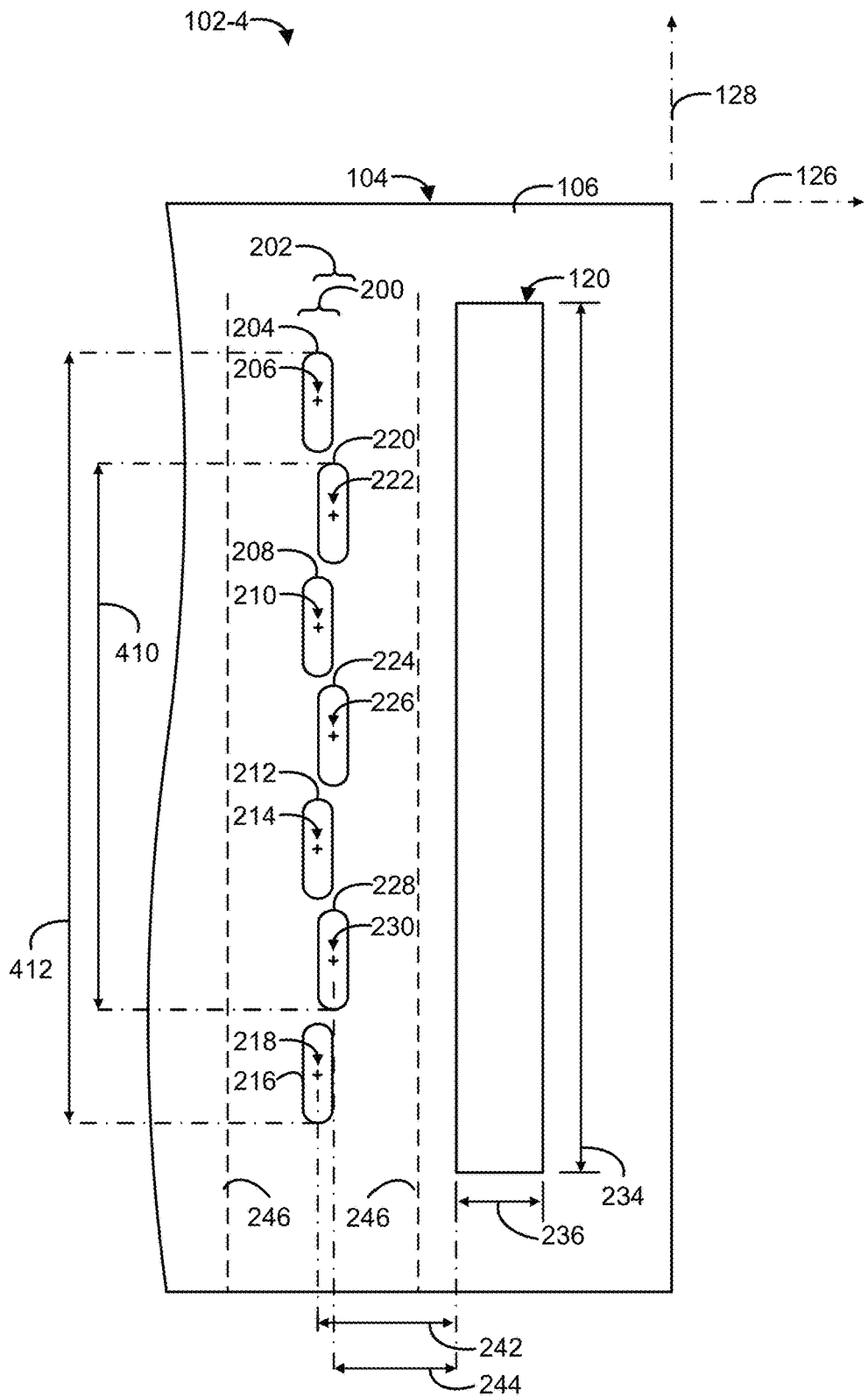
FIG. 5 illustrates a top-down view of an example waveguide with lobe suppression, in accordance with one or more implementations of the present disclosure.

FIG. 5 illustrates a top-down view of an example waveguide 102-4 with lobe suppression, in accordance with one or more implementations of the present disclosure. The waveguide 102-4 is an example of the waveguides 102, 102-1, 102-2, and 102-4.

In the example, the first radiating slots 204, 208, 212, and 216 are arranged in a first row 200, and the first row 200 may be parallel to the longitudinal direction 128. The first radiating slots 204, 208, 212, and 216 may define respective first centroids 206, 210, 214, and 218. In an example, centroids may be defined as a geometric center of the respective shape or radiating slot. Second radiating slots 220, 224, and 228 are arranged in a second row 202, and the second row 202 may be parallel to the longitudinal direction 128. The second radiating slots 220, 224, and 228 may define respective second centroids 222, 226, and 230. The radiating slots 204, 208, 212, 216, 220, 224, and 228 may be radiating slots that radiate electromagnetic waves propagated through the pipe 104. The radiating slots 204, 208, 212, 216, 220, 224, and 228 may be various geometric shapes. The radiating slots 204, 208, 212, 216, 220, 224, and 228 may be defined within boundaries of the channel 246, communicating with the dielectric 114 or empty space defined therein. The first row 200 may be interleaved with the second row 202. The parasitic groove 120 may be defined on the surface 106.

In an example, the parasitic groove 120 is defined in parallel with the longitudinal direction 128. As such, the parasitic groove 120 may be in parallel with the first row 200 and the second row 202. The parasitic groove 120 may be spaced a first distance 242 from the first centroids 206, 210, 214, and 218 and spaced a second distance 244 from the second centroids 222, 226, and 230. The parasitic groove 120 may be spaced from the first centroids 206, 210, 214, and 218 and the second centroids 222, 226, and 230 in the latitudinal direction. In an example, the parasitic groove 120 defines a groove length 234. The groove length 234 may be defined as the longest measure between edges of the parasitic groove 120 and may be uniform or non-uniform across the groove 120. In the example, the length 234 is greater than a first-row length 410 (as shown in FIG. 4). The length 234 may also be greater than a second-row length 412 (also shown in FIG. 4). In the example, the parasitic groove 120 defines a width 236. The width 236 is defined in the latitudinal direction 126. In the example, the width 236 is related to a width of the radiating slots 204, 208, 212, 216, 220, 224, and 228, and the width 236 may be uniform or non-uniform across the parasitic groove 120.

Figure 6:
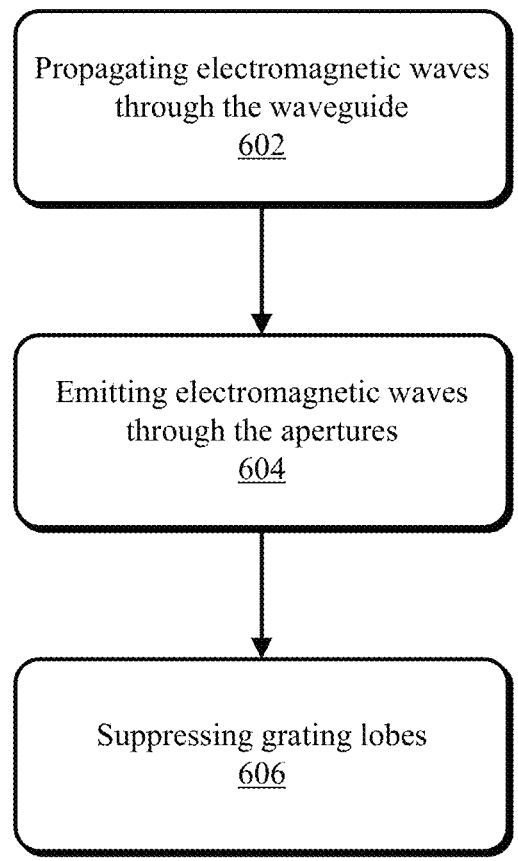
FIG. 6 illustrates an example method performed with a waveguide with lobe suppression, in accordance with one or more implementations of the present disclosure.

Referring to FIG. 6, an example method 600 in accordance with one or more implementations of the present disclosure. The method 600 is shown as a set of blocks that specify operations and steps performed but are not necessarily limited to the order or combinations shown for performing the operations by the respective blocks. Further, any of one or more of the operations may be repeated, combined, reorganized, omitted, or linked to provide a wide array of additional and/or alternate methods. In portions of the following discussion, reference may be made to the examples of the preceding figures, reference to which is made for example only. The techniques are not limited to performance by one entity or multiple entities operating on one device.

At 602, electromagnetic waves are propagated through the waveguide 102. As an example, the transceiver 110 may output electromagnetic waves through the coupler 108 into the channel 246.

At 604, electromagnetic waves are propagated through the channel 246 and out of the radiating slots 118. At 606, the electromagnetic waves are suppressed by the groove 120, groove 122, groove 400, other grooves not specifically depicted, or any combination thereof.

As referenced herein, adjectives, including first, second, and other, are only used to provide clarity and designation of elements. As an example, the first row 200 and the second row 202 may be interchanged and are only used for clarity when referring to the instant figures.

The following are some additional examples of a waveguide with lobe suppression:

Example 1. An apparatus, the apparatus comprising: a waveguide including: a pipe for containing a dielectric, the pipe defining an open end to a longitudinal direction through the pipe; an array of radiating slots through a surface of the pipe and in communication with the dielectric; and at least one parasitic groove separate from the pipe and with a length that is in parallel with the array of radiating slots.

Example 2. The waveguide of any preceding example, wherein the at least one parasitic groove is spaced a first distance from the array of radiating slots to suppress grating lobes in an antenna pattern.

Example 3. The waveguide of any preceding example, wherein the at least one parasitic groove has a depth less than a depth of the pipe.

Example 4. The waveguide of any preceding example, wherein the at least one parasitic groove has a depth that is uniform.

Example 5. The waveguide of any preceding example, wherein the at least one parasitic groove has a narrow width that is uniform.

Example 6. The waveguide of any preceding example, wherein the pipe has a closed end opposite the open end.

Example 7. The waveguide of any preceding example, wherein the at least one parasitic groove has a length that extends along an entire length of the array of radiating slots.

Example 8. The waveguide of any preceding example, wherein the at least one parasitic groove has a length that extends beyond a length of the array of radiating slots.

Example 9. The waveguide of any preceding example, further comprising, a second parasitic groove separate from the pipe and in parallel with the first parasitic groove and the array of radiating slots.

Example 10. The waveguide of any preceding example, wherein the second parasitic groove is on a first side of the array of radiating slots and the at least one parasitic groove is on an opposite side of the array of radiating slots.

Example 11. The waveguide of any preceding example, wherein the longitudinal direction is parallel to a propagation direction associated with the waveguide.

Example 12. A system, the system comprising: a coupler; a transceiver operable upon actuation to interact with electromagnetic waves associated with the coupler; and a waveguide comprising: a pipe for capturing the electromagnetic waves and containing a dielectric, the pipe defining an open end to a longitudinal direction through the pipe; an array of radiating slots through a surface of the pipe and in communication with the dielectric; and at least one parasitic groove separate from the pipe and with a length that is in parallel with the array of radiating slots.

Example 13. The system of any preceding example, wherein the at least one parasitic groove is spaced a first distance from the array of radiating slots to suppress grating lobes in an antenna pattern.

Example 14. The system of any preceding example, wherein the at least one parasitic groove has a depth less than a depth of the pipe.

Example 15. The system of any preceding example, wherein the at least one parasitic groove has a depth that is uniform.

Example 16. The system of any preceding example, wherein the at least one parasitic groove has a narrow width that is uniform.

Example 17. The system of any preceding example, wherein the pipe has a closed end opposite the open end.

Example 18. The system of any preceding example, wherein the at least one parasitic groove has a length that extends along an entire length of the array of radiating slots.

Example 19. The system of any preceding example, wherein the system comprises part of an automobile that detects the electromagnetic waves for operating on a roadway.

Example 20. The system of any preceding example, wherein the at least one parasitic groove comprises a first parasitic groove on a first side of the array of radiating slots and a second parasitic groove on a second, opposite side of the array of radiating slots.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. An apparatus, the apparatus comprising:
    a waveguide including:
        a pipe configured to contain a dielectric, the pipe defining an open end to a longitudinal direction through the pipe;
        an array of radiating slots through a surface of the pipe and in communication with an inside surface of the pipe; and
        at least one parasitic groove:
            separate from the pipe;
            with at least a portion of a length that is parallel to the array of radiating slots; and
            spaced at a distance from the array of radiating slots to suppress grating lobes in an antenna pattern.

2. The waveguide of claim 1, wherein the at least one parasitic groove has a depth less than a depth of the pipe.

3. The waveguide of claim 1, wherein the at least one parasitic groove has a depth that is uniform.

4. The waveguide of claim 1, wherein the at least one parasitic groove has a uniform width.

5. The waveguide of claim 1, wherein the pipe has a closed end opposite the open end.

6. The waveguide of claim 1, wherein the at least one parasitic groove has a length that extends along an entire length of the array of radiating slots.

7. The waveguide of claim 6, wherein the at least one parasitic groove has a length that extends beyond a length of the array of radiating slots.

8. The waveguide of claim 1, further comprising, another parasitic groove that is separate from the pipe and parallel to the parasitic groove and the array of radiating slots.

9. The waveguide of claim 8, wherein the other parasitic groove is on a first side of the array of radiating slots and the parasitic groove is on an opposite side of the array of radiating slots.

10. The waveguide of claim 1, wherein the longitudinal direction is parallel to a propagation direction associated with the waveguide.

11. The waveguide of claim 1, wherein the grating lobes are based on a spacing and an arrangement of the array of radiating slots.

12. A system, the system comprising:
    a coupler;
    a transceiver operable upon actuation to interact with electromagnetic waves associated with the coupler; and
    a waveguide comprising:
        a pipe configured to capture the electromagnetic waves and contain a dielectric, the pipe defining an open end to a longitudinal direction through the pipe;
        an array of radiating slots through a surface of the pipe and in communication with an inside surface of the pipe; and
        at least one parasitic groove:
            separate from the pipe;
            with at least a portion of a length that is parallel to the array of radiating slots; and
            spaced at a distance from the array of radiating slots to suppress grating lobes in an antenna pattern.

13. The system of claim 12, wherein the at least one parasitic groove has a depth less than a depth of the pipe.

14. The system of claim 12, wherein the at least one parasitic groove has a depth that is uniform.

15. The system of claim 12, wherein the at least one parasitic groove has a uniform width.

16. The system of claim 12, wherein the pipe has a closed end opposite the open end.

17. The system of claim 12, wherein the at least one parasitic groove has a length that extends along an entire length of the array of radiating slots.

18. The system of claim 12, wherein the system comprises part of an automobile that detects the electromagnetic waves for operating on a roadway.

19. The system of claim 12, wherein the at least one parasitic groove comprises a first parasitic groove on a first side of the array of radiating slots and a second parasitic groove on a second, opposite side of the array of radiating slots.

20. The system of claim 12, wherein the grating lobes are based on a spacing and an arrangement of the array of radiating slots.

* * * * *